United States Patent
Ando et al.

(10) Patent No.: US 8,076,891 B2
(45) Date of Patent: Dec. 13, 2011

(54) MOTOR CONTROLLER

(75) Inventors: Toru Ando, Aichi (JP); Tomohisa Kameyama, Aichi (JP)

(73) Assignee: Okuma Corporation, Niwa-Gun, Aichi (JP)

(*) Notice: Subject to any disclaimer, the term of this patent is extended or adjusted under 35 U.S.C. 154(b) by 247 days.

(21) Appl. No.: 12/504,895

(22) Filed: Jul. 17, 2009

(65) Prior Publication Data

US 2010/0039059 A1 Feb. 18, 2010

(30) Foreign Application Priority Data

Aug. 12, 2008 (JP) .................. 2008-207980

(51) Int. Cl.
*G05B 11/42* (2006.01)
(52) U.S. Cl. ........ 318/610; 318/560; 318/590; 318/591; 318/609
(58) Field of Classification Search .......... 318/560, 318/590, 591, 609, 610
See application file for complete search history.

(56) References Cited

U.S. PATENT DOCUMENTS

| | | | | |
|---|---|---|---|---|
| 5,992,950 A | * | 11/1999 | Kumar et al. | 303/151 |
| 6,425,585 B1 | * | 7/2002 | Schuelke et al. | 280/5.511 |
| 7,067,999 B2 | * | 6/2006 | Sugano et al. | 318/372 |
| 2005/0253542 A1 | * | 11/2005 | Sugano et al. | 318/371 |
| 2007/0042865 A1 | * | 2/2007 | Steen et al. | 477/182 |

FOREIGN PATENT DOCUMENTS

| | | | |
|---|---|---|---|
| JP | 05204429 A | * | 8/1993 |
| JP | 2002236507 A | * | 8/2002 |
| JP | 2007-282435 | | 10/2007 |

OTHER PUBLICATIONS esp@cenet patent abstract for Japanese Publication No. 2007282435, Publication date Oct. 25, 2007 (1 page).

* cited by examiner

*Primary Examiner* — Walter Benson
*Assistant Examiner* — Kawing Chan
(74) *Attorney, Agent, or Firm* — Osha • Liang LLP

(57) ABSTRACT

A motor controller drives and controls a motor to drive a shaft subject to gravity. The motor controller includes a PI control unit which controls the velocity of the motor, a brake which prevents the falling of the shaft in accordance with a brake signal, and a storage unit which detects the brake signal input to the brake. On the basis of the state of the detected brake signal, the storage unit stores the torque command value when the brake signal has changed from off to on, and sets the stored torque command value to an integral component of the PI control unit when the brake signal has changed from on to off.

1 Claim, 8 Drawing Sheets

MOTOR CONTROLLER

CROSS-REFERENCE TO RELATED APPLICATIONS

This application claims priority to Japanese Patent Application No. 2008-207980, filed on Aug. 12, 2008, which is incorporated herein by reference in its entirety.

BACKGROUND OF THE INVENTION

1. Field of the Invention

The present invention relates to a motor controller, and more particularly, it relates to a motor controller having a function which prevents the falling of a shaft when a power supply to the motor is turned on.

2. Description of the Related Art

The Z shaft of a vertical machining center or a Y shaft of a horizontal machining center are commonly referred to as "gravity shafts". A gravity shaft is shaft which falls when the power supplied to a motor for driving this gravity shaft is turned off. To account for this, for example, a mechanical brake is provided to prevent the falling of the gravity shaft. However, in order to prevent the falling of the gravity shaft, it is necessary to not only provide, for example, the mechanical brake, but also to control the on/off timing of a motor power supply signal and the on/off timing of a brake signal.

FIG. 4 shows the on/off timing of the brake signal and the on/off timing of the motor power supply signal at the start and cutoff of the supply of power to the motor which drives the gravity shaft. In the graph of FIG. 4, T41 indicates the timing of turning on the power supply signal and T42 indicates the timing of turning off the brake signal in when the motor is in a clamped state when power is first supplied. Moreover, T43 indicates the timing of turning on the brake signal and T44 indicates the timing of turning off the power supply signal when the supply of power to the motor is cut off. As apparent from this graph, when the supply of power to the motor is cut off, a signal for turning on a brake of the gravity shaft is first output (T43), and the power supply to the motor is cut off (T44) after the brake has actuated a motor clamp or the like, thereby preventing the falling of the gravity shaft.

On the other hand, when the motor is first started, the supply of power to the motor is first switched on (T41), and then a signal for turning off the brake of the gravity shaft is output (T42), thereby preventing the falling of the gravity shaft. Normally, because a certain amount of time is required to actuate the brake to bring the gravity shaft into a clamped state, the timing of turning off of the power supply signal must be delayed for a length of time equal T44−T43.

Furthermore, unlike a motor for driving a horizontal shaft, the motor for driving the gravity shaft requires torque to hold a gravity part. Therefore, when power is first supplied to the motor, the gravity shaft will fall until the output torque of the motor equals or exceeds the minimum torque able to hold the gravity part (hereinafter referred to as holding torque). Accordingly, there is a method for compensation by adding a holding torque component to a torque command value. Here, FIG. 5 is a block diagram showing one example of a motor controller to which such a method for compensating for the holding torque component is applied. A motor 54 is driven and controlled in accordance with a velocity command V* calculated by an upper controller (e.g., position control), which is not shown in the diagram. The flow of control is described below.

An encoder 55 detects the position of a rotor of the motor 54. A conversion unit 56 calculates a velocity feedback V from the value of the position detected by the encoder 55. A velocity control unit 51 performs arithmetic operations for, for example, PI control from the velocity feedback V and the velocity command V* input from the upper controller, and calculates a torque command. An arithmetic unit adds, to the torque command, the holding torque component input from a holding torque compensating unit 57 to calculate a torque command value T*. Then, a current control unit 52 calculates an inverter drive command from the torque command value T* and a current feedback I of a current supplied to the motor 54. The current is converted from a direct current to an alternating current in an inverter circuit 53 on the basis of the inverter drive command, and this current is supplied to the motor 54 to drive and control the motor 54.

Japanese Patent Publication Laid-open No. 2007-282435 (Patent Document 1) describes a controller for controlling a motor by a torque command value to which a preset toque compensation value is added when a brake for mechanically holding a motor shaft has released the motor shaft. With this controller, when the brake is released from the motor shaft, the toque compensation value can be added to the torque-command value to suppress a protrude amount wherein a work piece falls more than necessary and protrude from a set position.

In the above-described conventional method for controlling the on/off timing of the brake signal and the on/off timing of the motor power supply signal, the output torque of the motor when power is first supplied is smaller than the holding torque, and the gravity shaft therefore begins to fall. When the gravity shaft falls, the output torque of the motor changes. The amount of the change is determined by an integral component in the arithmetic operation for the PI control used in velocity control as indicated by the velocity control unit 51 in FIG. 5. Thus, the output torque of the motor does not change abruptly, but always changes at a given time constant. As a result, by the time the output torque of the motor becomes equal to the holding torque, the gravity shaft has already fallen in a considerable amount. Torque is then abruptly generated to make up for the amount of this fall, which disadvantageously results in an oscillating torque as shown in FIG. 6.

Furthermore, the method for compensating for the holding torque component described as a conventional technique is based on the assumption that the holding torque component is constant. First, the application of this method to a normal gravity shaft is considered. Here, one example of the configuration of the gravity shaft is shown in FIG. 7. In the diagram of FIG. 7, the gravity shaft includes a ball screw 73 attached in the direction of gravity, a spindle head 74 movable along the ball screw 73, a motor 71 for driving and controlling the spindle head 74, and a brake 72 provided to prevent the spindle head 74 from falling. When the spindle head 74 vertically moves, the holding torque is not changed by its position. Thus, an appropriate compensation can be made by the method for compensating for the holding torque component (constant value).

However, in the case of a rotation shaft of a rotary table mounted on a trunnion unit of a five-shaft processing machine of a machine tool, the holding torque varies according to the position of the rotation shaft. Thus, in the conventional method for compensating for the holding torque component of the constant value at the start of supply of power to the motor, the compensation torque is often overcompensated or under-compensated depending on the position of the rotation shaft. Here, the change of motor output torque when the compensation torque is under-compensated is shown in FIG. 8. For example, an under-compensated torque component at time T81 is ΔTo, so that the shaft falls. On the other hand, in the case of overcompensation, the motor output torque is greater than the holding torque, and the shaft rises for a moment. That is to say, the problem is that if the compensation torque is not properly set, the behavior of the gravity shaft at the start of power application to the motor is unstable.

Moreover, when a work piece is mounted on the rotary table, the holding torque changes not only depending on the position of the work piece, but also depending on the weight, shape, or mounting position of the work piece. There is therefore also in such situations a problem of unstable behavior of the gravity shaft when power is first supplied to the motor.

SUMMARY OF THE INVENTION

The present invention provides a motor controller capable of stabilizing the behavior of a gravity shaft and preventing the falling of the gravity shaft when power is supplied to a motor.

According to the present invention, there is provided a motor controller which drives and controls a motor to drive a shaft subject to gravity, the motor controller comprising a PI control unit which controls the velocity of the motor; a brake which prevents the falling of the shaft in accordance with a brake signal; and a storage unit which detects the brake signal input to the brake, and, on the basis of the state of the detected brake signal, stores a torque command value calculated by the PI control unit, wherein the storage unit stores the torque command value when the brake signal has changed from off to on, and the storage unit sets the stored torque command value to an integral component of the PI control unit when the brake signal has changed from on to off.

By employing the motor controller of the present invention, the behavior of the shaft during the supply of power to the motor can be stable, and the falling of the shaft at the start of power application to the motor can be prevented even when the holding torque changes depending on, for example, the position of the shaft.

DETAILED DESCRIPTION OF THE INVENTION

Figure 1:
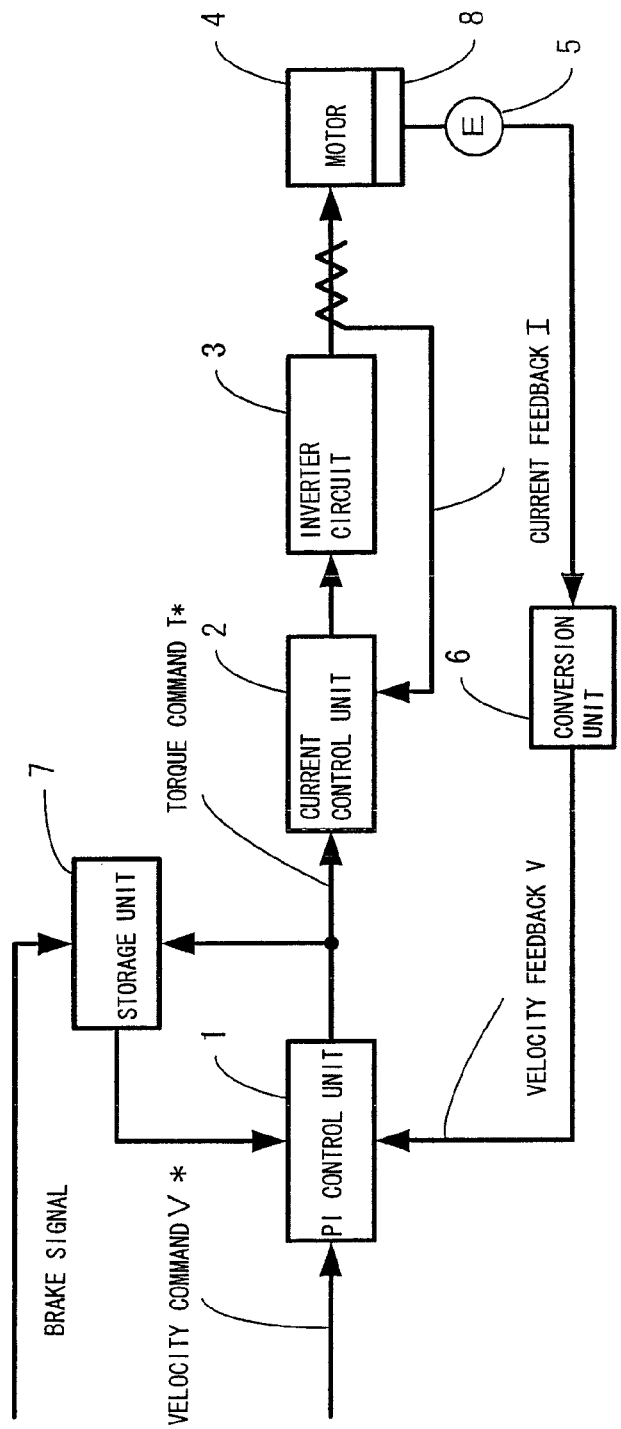
FIG. 1 is a diagram showing a control block in a motor controller having a function of preventing the falling of a shaft according to the present invention.

An embodiment of a motor controller according to the present invention will hereinafter be described in reference to the drawings. FIG. 1 is a diagram showing a control block in a motor controller according to the present invention having a function of preventing the falling of a shaft. In the example described to illustrate the present embodiment, a shaft (not shown) is mechanically connected to a motor 4.

An encoder 5 detects the position of a rotor of the motor 4. A conversion unit 6 calculates a velocity feedback V from the value of the position detected by the encoder 5. A PI control unit 1 performs arithmetic operations for, for example, PI control from the velocity feedback V and a velocity command V* input from an upper controller (not shown), and calculates a torque command T*. A current control unit 2 calculates an inverter drive command from the torque command value T* and a current feedback I of a current supplied to the motor 4. The current is converted from a direct current to an alternating current in an inverter circuit 3 on the basis of the inverter drive command, and this current is supplied to the motor 4 to drive and control the motor 4.

A brake 8 prevents the falling of the shaft in accordance with a brake signal. Specifically, when the brake signal changes from off to on, the brake 8 clamps the motor 4 to prevent the falling of the shaft. On the other hand, when the brake signal changes from on to off, the brake 8 unclamps the motor 4. As described in connection with the conventional technique, the brake 8 operates to clamp the motor 4 when the power application to the motor 4 is cut off, while the brake 8 operates to unclamp the motor 4 when the supply of power is begun. Thus, the on/off timing of the brake signal input to the brake 8 and the on/off timing of a power supply signal input to the motor 4 are properly controlled.

The motor controller according to the present invention is characterized by having a storage unit 7. The storage unit 7 detects the brake signal input to the brake 8. Further, the storage unit 7 outputs the state of the detected brake signal to the PI control unit 1. The storage unit 7 also stores the torque command value T* calculated by the PI control unit 1 in accordance with the state of the brake signal. Specifically, the storage unit 7 stores the torque command value T* calculated by the PI control unit 1 when the brake signal input to the brake 8 changes from off to on. Moreover, the storage unit 7 outputs the stored torque command value T* to the PI control unit 1 when the brake signal input to the brake 8 changes from on to off.

From FIG. 1 it can be seen that the storage unit 7 performs processing the same controller including the PI control unit 1. However, the storage unit 7 can perform the processing on the upper controller. Normally, the upper controller issues commands including a power application starting command. Thus, the upper controller can command the controller including the PI control unit 1 to output the torque command value T* stored in the storage unit 7 to the PI control unit 1.

An explanation is given below to show that the torque command value T* stored in the storage unit 7 is equal to a value corresponding to a holding torque component of the shaft. In this example, a gravity shaft is stopped in a powered state, and control in this state is described. Because the gravity shaft is in a powered state, the brake 8 keeps the motor 4 unclamped. In order to actuate the brake 8 from this state, it is necessary to change the brake signal from off to on. When this is done, the power-applied state of the motor 4 is continued for a while to prevent falling of the gravity shaft. That is, when the brake signal has changed from off to on, the power-applied state of the motor 4 is continued. Thus, as the storage unit 7 stores the torque command value T* when the brake signal is changed from off to on, this torque command value T* is equal to a value corresponding to the holding torque part of the shaft.

Figure 2:
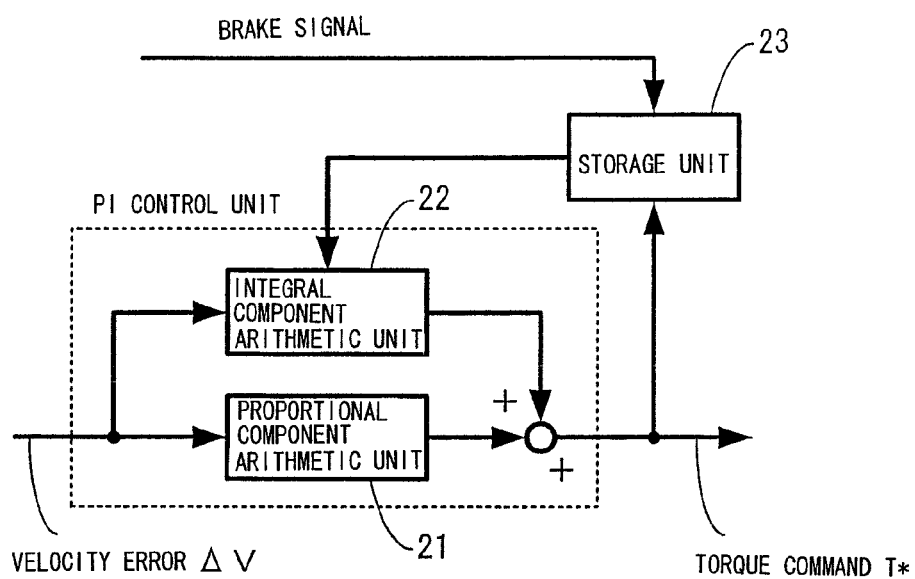
FIG. 2 is a diagram showing a control block around a PI control unit in the motor controller shown in FIG. 1.

Next, the PI control unit 1 is described with reference to FIG. 2. FIG. 2 is a diagram showing a control block around the PI control unit 1 in a motor controller according to the present invention having the function of preventing falling of the shaft.

The PI control unit has a proportional component arithmetic unit 21 and an integral component arithmetic unit 22. The proportional component arithmetic unit 21 and the integral component arithmetic unit 22 perform arithmetic operations based on an input velocity error $\Delta V$, and add values calculated by these arithmetic units 21 and 22 to calculate the torque command value $T^*$. A storage unit 23 (same as the storage unit 7 shown in FIG. 1) stores the torque command value $T^*$ when the brake signal changes from off to on, and the storage unit 23 outputs the stored torque command value $T^*$ to the integral component arithmetic unit 22 when the brake signal changes from on to off. Then, the integral component arithmetic unit 22 uses the value output from the storage unit 23 as an initial value of an integral component at the start of power application. It should also be noted that, although the configuration and content of processing as briefly described here are connected with the PI control unit 1, PI control for, for example, carrying out limiting processing or damping processing of the integral component can also be performed.

Figure 3:
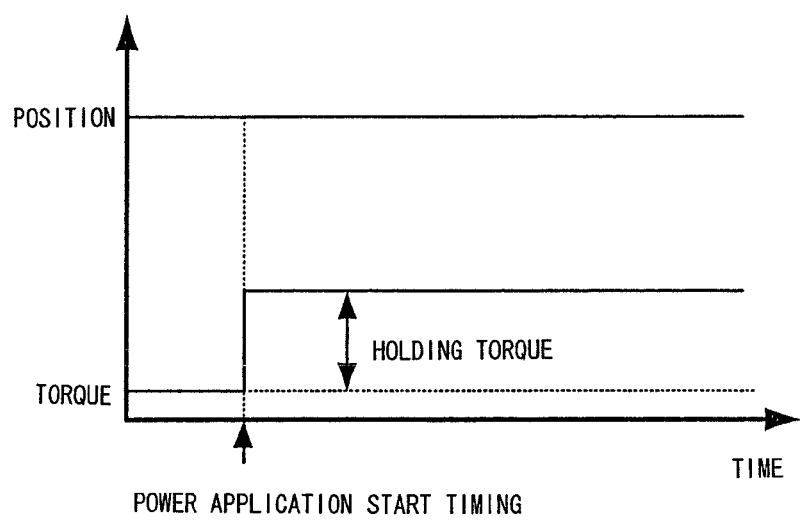
FIG. 3 is a graph showing the position of a shaft and the behavior of torque before and after power supplied to a motor employing a motor controller according to the present invention.
Figure 4:
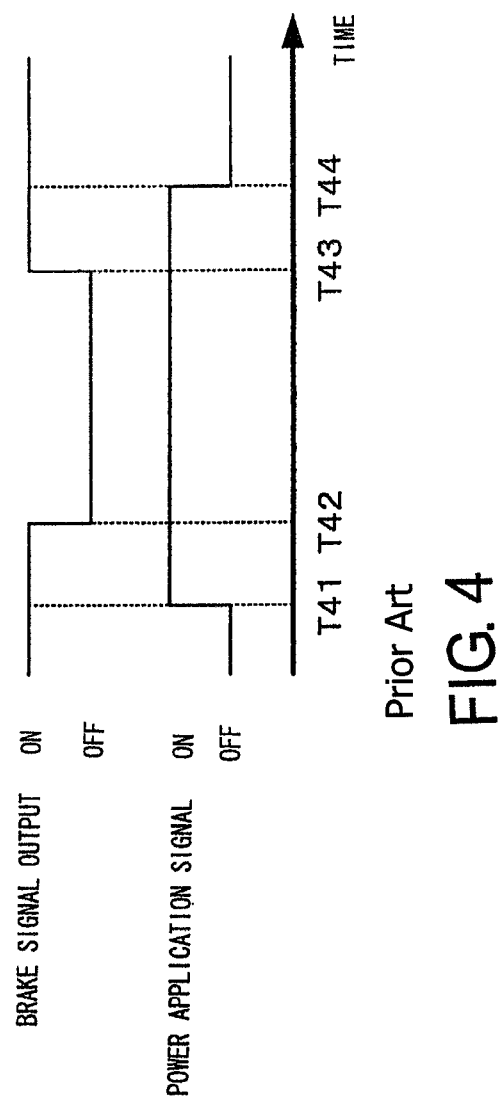
FIG. 4 is a graph showing the on/off timing of a brake signal and the on/off timing of a power supply signal when power supply to a motor for driving the gravity shaft is turned on and then cut off.
Figure 5:
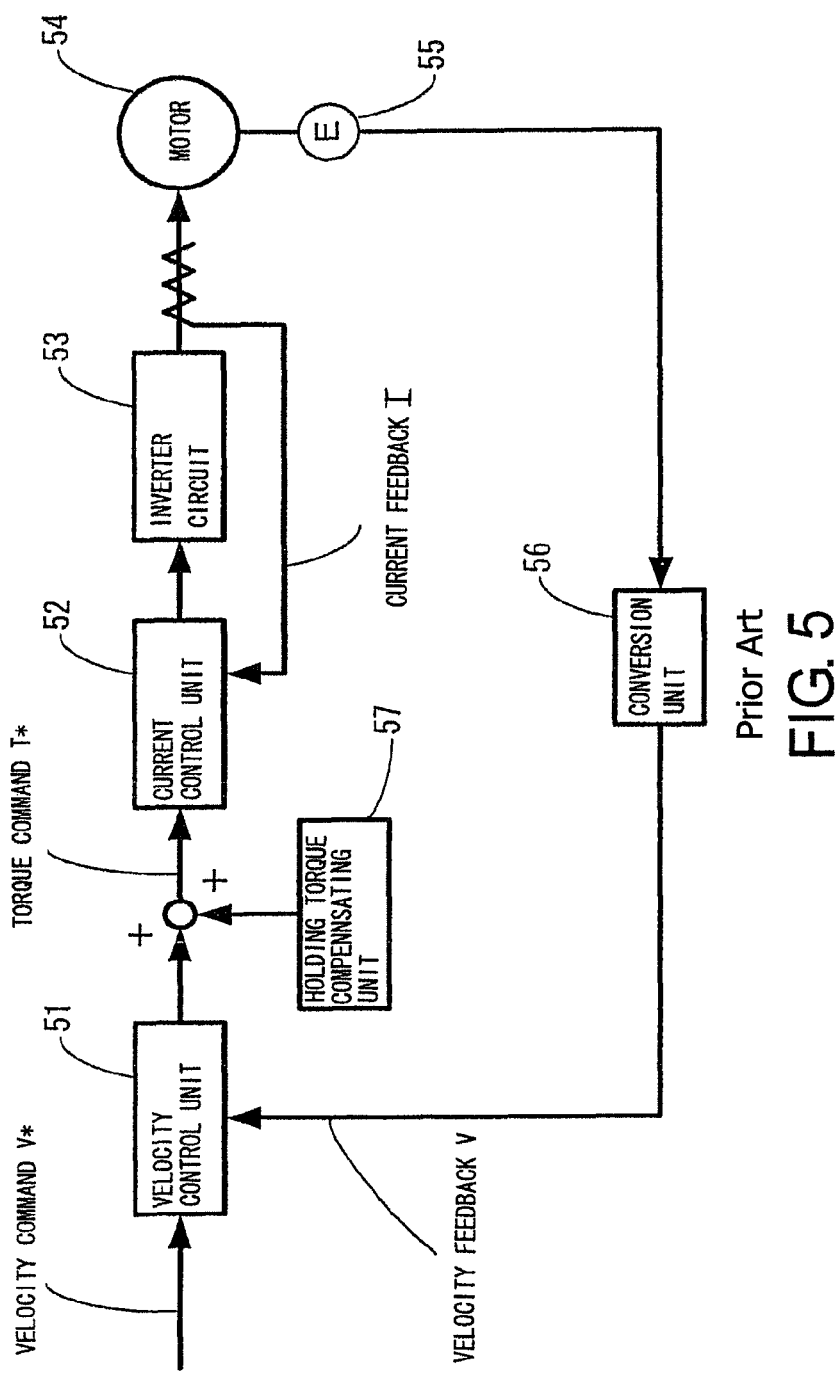
FIG. 5 is a block diagram showing a control block in a motor controller employing a conventional method for compensating for a holding torque component.
Figure 6:
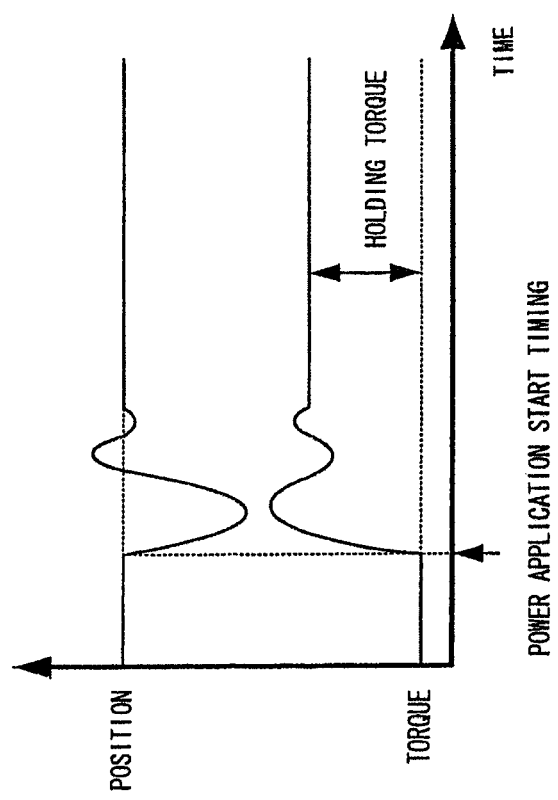
FIG. 6 is a graph showing an example of the relationship between the position of the gravity shaft and the behavior torque before and after power is supplied to the motor.
Figure 7:
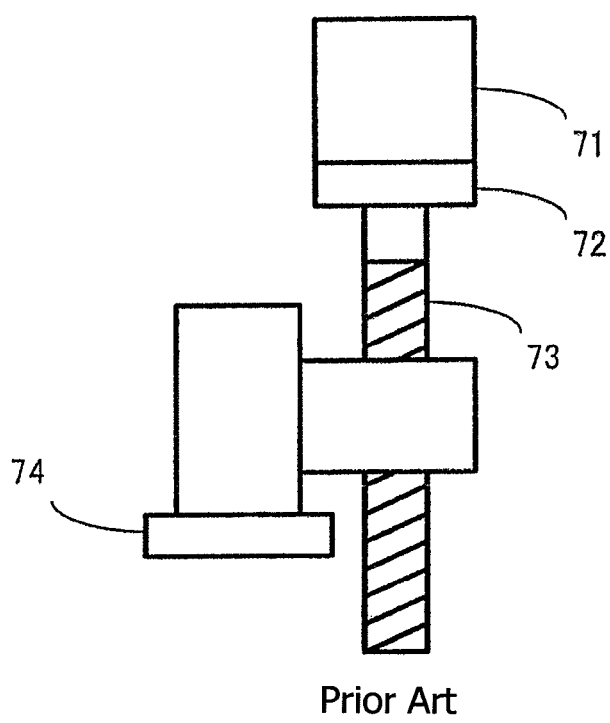
FIG. 7 is a diagram showing an example configuration of a gravity shaft.
Figure 8:
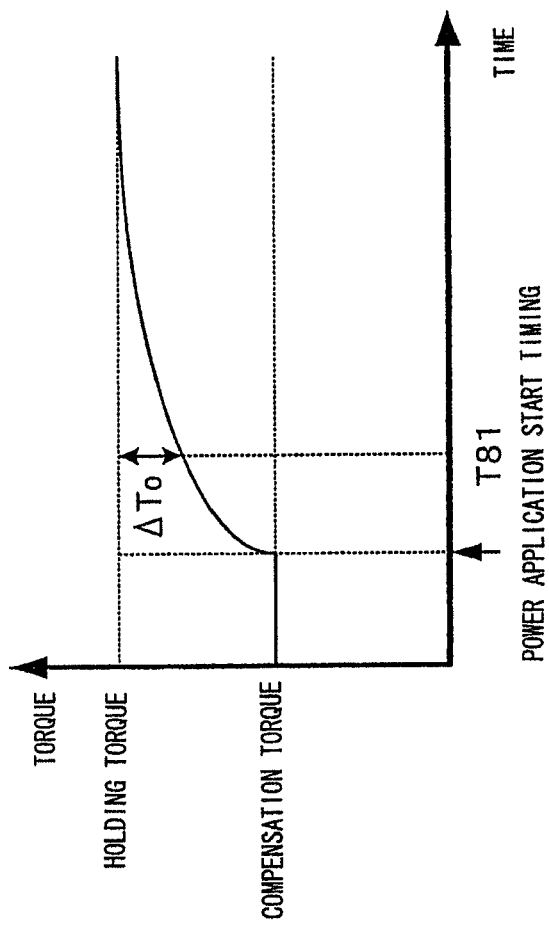
FIG. 8 is a graph showing one example of the behavior of torque in a conventional motor controller when compensating for the holding torque component.

Next, the position of the shaft and the behavior of torque at the start of power application in the motor controller according to the present invention are described with FIG. 3. As apparent from the graph shown in FIG. 3, torque corresponding to the holding torque of the shaft can be output in response to the timing of starting power application, so that there is no change in the position of the shaft. That is, the falling of the shaft can be prevented. This graph shows a particular position of the shaft and torque just before and after the supply of power to the motor begins. At other positions, the value corresponding to the holding torque component also changes, but similarly behaves with no position change.

Next, effects on the motor control when the holding torque greatly changes depending on the position of the shaft are considered. In such a case, if the shaft is moved and its position is changed after power is supplied, a difference appears between the holding torque and the stored torque command value. This difference is compensated for by the output of the PI control unit, which becomes an integral component if there is substantially no velocity error. This integral component is necessary to hold the shaft, but may affect the motor control. That is, this integral component is not suitable for the position of the shaft. However, if the stored torque command value is set to the integral component, the integral component also changes when the position of the shaft changes. In this case, the integral component has a value which is appropriate in terms of control, provides good response characteristics, and enables stable motor control.

What is claimed is:

1. A motor controller which drives and controls a motor to drive a shaft subject to gravity, the motor controller comprising:
    a PI control unit which controls the velocity of the motor;
    a brake which prevents the falling of the shaft in accordance with a brake signal; and
    a storage unit which detects the brake signal input to the brake, and on the basis of the state of the detected brake signal, stores a torque command value calculated by the PI control unit,
    wherein the storage unit stores the torque command value when the brake signal has changed from off to on, and the storage unit sets the stored torque command value to an integral component of the PI control unit when the brake signal has changed from on to off.

* * * * *